US 6,564,976 B2

(12) United States Patent
Bettinger et al.

(10) Patent No.: US 6,564,976 B2
(45) Date of Patent: May 20, 2003

(54) VISCO ELASTIC DISPLACEMENT CONTROLLER

(76) Inventors: David S. Bettinger, 8030 Coventry, Grosse Ile, MI (US) 48138; Frederick Stoll, 7630 Rozell Ct., West Chester, OH (US) 45069

( * ) Notice: Subject to any disclaimer, the term of this patent is extended or adjusted under 35 U.S.C. 154(b) by 70 days.

(21) Appl. No.: 09/859,253

(22) Filed: May 17, 2001

(65) Prior Publication Data

US 2002/0170929 A1 Nov. 21, 2002

(51) Int. Cl.[7] .............................. B65D 88/54
(52) U.S. Cl. ............... 222/340; 222/386; 267/114; 267/124
(58) Field of Search ................ 222/340, 386; 267/114, 128, 124

(56) References Cited

U.S. PATENT DOCUMENTS

| 2,723,846 A | * | 11/1955 | Holder et al. ............... 267/114 |
| 3,750,389 A | * | 8/1973 | Breed ........................ 267/114 |
| 4,791,251 A | * | 12/1988 | Carter et al. .............. 200/33 R |
| 4,948,927 A | * | 8/1990 | Pajak ....................... 200/33 R |
| 5,188,260 A | * | 2/1993 | Bettinger ..................... 222/95 |

* cited by examiner

*Primary Examiner*—Philippe Derakshani

(57) ABSTRACT

A deformable polymeric member is drawn or forced through or over a die at an imperceptible rate of travel whereby the visco elastic characteristics of the polymeric member delay and control the displacement for external utility. With appropriate components, force selection determines rate of displacement. Embodiments include long term lubricators and self powered medication infusers.

12 Claims, 3 Drawing Sheets

VISCO ELASTIC DISPLACEMENT CONTROLLER

The development effort for this current invention was funded under US Army TACOM SBIR A96-179, Contract Number DAAE07-98-C-L007.

No related applications referenced

BACKGROUND OF THE INVENTION a) Field of the Invention

The present invention relates to a force regulator that uses the visco elastic phenomena of a polymer as a timing mechanism and more particularly to an automatic dispenser whereby the response under stress of a visco elastic polymeric provides continuous, controlled displacement of a force generator, thereby releasing its stored potential energy over a specified duration for external utility such as the dispensing of a viscous fluid. Such dispensers are utilized for dispensing lubricants, medications, blood plasma, and other viscous liquids where self powered administration and generally constant rates of delivery are considerations.

b) Description of the Prior Art

In the delayed dispensing prior art Bettinger, U.S. Pat. No. 5,188,260, discloses a device for delayed dispensing of viscous liquids in which the plastic material of the dispensing container is selected for its ability to constrict in a predictable manner upon exposure to heat such that the invention is capable of integral temperature responsive automatic flow control. Bettinger is a low pressure device that relies on the dual function of force generation and force control from within a single homogeneous polymer material. Bettinger is a long duration device that uses internal visco elastic effects, but the volume of the fluid charge is limited.

In the prior art of retarded circuit breakers, Pajak in U.S. Pat. No. 4,948,927 discloses an actuator that uses the tacky quality of an adhesive for its visco-elastic grip to delay the release of an electric contact circuit closure. Pajak does use a resilient member as a one-time, spring-like return mechanism. Carter, et al. in U.S. Pat. No. 4,791,251 is also a retarded circuit breaker that applies the device to short term delay and timing for dispensing of a volume of fluid on a cyclical basis. Pajak and Carter are only capable of short term durations of at most minutes where the displacement that results is generated nearly instantaneously.

SUMMARY OF THE INVENTION

In order to overcome the above-mentioned deficiencies and problems in the prior art, this invention teaches the construction of a visco elastic displacement controller, which is comprised of a prestressed force generator, in close contact with and having its resultant force delayed, and controlled by a polymeric deformable member that is deformed by a die. The force is selected to generate the rate of displacement. The length of the deformable member determines the duration of the displacement activity.

This visco elastic displacement controller is self-activating and requires no power. The present invention uses stored mechanical, pneumatic, or hydraulic energy to forcibly pressure and push or pull the deformable polymer member through the die. For the purposes of this invention duration means the total time period of visco elastic deflection and response which results in exterior utility. Such a period may range from months to years depending upon the application.

OBJECTS OF THE INVENTION

A general object of this invention is to provide a timing mechanism for continuous displacement with a predictable duration measured in months and years.

Another object of this invention is to provide a simple and inexpensive timing and control mechanism for dispensers and actuators that is self-powered and does not rely on electrical motors or batteries.

Another general object of this invention is to provide a viscous fluid dispenser with delayed and continuous dispensing of charge.

Another general object of the invention is to provide a single point, snap on and permanent viscous fluid dispenser for fixed and mobile equipment and vehicles.

Another general object of the invention is to provide a continuous viscous fluid dispenser of lubricant that provides sufficient pressure to overcome common internal bearing resistance on a continuous basis.

Various embodiments of the current invention use components that are well recognized in the plastic working arts, namely dies and anchorage holding fixtures that provide force restraint, although the objects of these material working arts are in opposition to the objects of the current invention. The object of the plastic working arts is the manufacture and production of a mainly polymeric component. An object of the current invention is the registration of time for the restraint and controlled release of a force for external utility.

The current invention comprises both holdings and movable dies that are unhindered by holdings. It will be understood by one skilled in the art that holding fixtures of the current invention may be fixed or moveable and may utilize threads, pins, steps, and ledges. Such dies of the current invention impart pressure stresses and deformation to produce shaping to the surfaces and interiors of plastic media being forced through their orifices. Such dies of the current invention include movable, adjustable jaws, rollers, balls, pivots, threaded constrictors, and dies that create rotary or torque motion on the mainly polymeric media as it is treated to and modified by the shape of the die.

Still another object of the current invention is to provide a generally constant and linear, tailorable and adjustable, predictable rate of displacement for a predictable and extended duration of months or years.

Still another object of the current invention is to provide a variety of design options to the designer of devices since the current invention can be configured as fixed or movable, push or pull, flow through or flow back, and with as few as three components or with the complexity of adjustability.

It will be understood by one skilled in the art that many of the fixed, movable, and adjustable dies and die holders used in the processing of plastics are directly applicable to the teaching of this current invention. It will be understood by one skilled in the art that various mechanical springs including spiral, leaf, and compound are directly applicable to the teaching of this current invention.

It will be understood by one skilled in the art of the processing of metals and polymers that a broad body of art exists on the adjustability of dies used to shape, extrude, deform and constrict and that a substantial portion of these adjustable dies are applicable to the embodiments of the current invention taught herein including those dies that increase the induced stress by adjusting the size and shape of the die opening and also those dies that change the axial direction both internal and external to the die thereby inducing and increasing the axial bending moment on the deformable member.

It will further be understood by one skilled in the art that the visco elastic displacement controller of the current invention may also comprise embodiments whereby said force producing means is connected to and in close proximity to a follower with electrical conductive contact means selected to open and close a circuit as an indicator of a predetermined duration and displacement.

It will additionally be understood by one skilled in the art that the visco elastic displacement controller of the current invention may also comprise mechanical means for stopping and starting the motion of the controller with either a clamp on the tube, rod, strip or ribbon. Such means may include adjustable clamps on a portion of the deformable member and adjustable components of the die that produce a clamping action when tightened to their full extent.

It will further be understood by one skilled in the art that for embodiments of the current invention as a dispenser, the motion of the controller may be stopped with a cap or stopper to shut off the dispensing action.

It will be further understood by one skilled in the art that said deformable member or said container of the preferred embodiment may be inscribed with indicia selected to indicate displacement and time.

FEATURES OF THE INVENTION

In keeping with these objects and others which will become apparent hereinafter, one feature of this invention resides, briefly stated, a slender visco elastic polymer deformable member such as a strip, tube, or rod is drawn through a die, a system of rollers, or other constriction apparatus that produces a short deformation zone in the restraint member. The restraint progresses through or around the deformation-inducing die, driven by a pre-loaded spring or other mechanical energy storage/delivery device. The deformation of the restraint within the deformation zone can take the form of any local shaping produced by longitudinal bending, cross-section compression, cross-section bending, and cross-section deflection and distortion. The energy required to draw the visco elastic restraint through the deformation die increases with increasing travel rate. Because the travel rates of the current invention are so low, low spring energy storage levels associated with smaller springs can be utilized. Thus, it is an object of this invention to use a minimum of stored mechanical energy to produce long term, generally constant force generation for external utility such as dispensing. Because each station or increment of the restraint undergoes the same deformation history, a uniform force produces a uniform rate of travel if the cross-section is uniform. The wall thickness or other cross-section dimension of the restraint can be tailored along the length to compensate for the decrease in driving force that occurs with a simple spring, providing a uniform travel rate that can be used to produce a uniform dispensing rate in the lubricator application. Varying ambient temperature and moisture can also effect the visco elastic properties of the polymer restraint and therefore the rate of displacement.

TESTS

During the development of the current invention various bench tests of both pass-through fixed compression/constriction dies and pass-back fixed and movable bending dies were investigated. The following results for a polymer strip forced to bend around a movable/rotating wheel die by a hanging weight are instructive. For this strip bending test, multiple flat strips of visco elastic acetal polymer were drawn through a bending die by varying hanging weights. The bending die wheel had an outer radius of 0.35" and an inner wheel with a radius of 0.25", and both parts were machined from acetal. Three acetal strips were 0.40" wide with a thickness of 0.03 in. Three loadings of 110, 126, and 134 psi were used for a minimum of 1000 hours. A controlled environment of 72° F. and 50% RH was used for specimen preconditioning and testing. The displacement of the strips over time was measured with a hand rule at irregular time intervals, with an accuracy of ±0.01". All hanging weight assemblies were weighed with a calibrated electronic balance. The three loadings produced displacements of 0.8, 1.5, and 2 inches respectively. The linearity of the displacements in relation to the imposed forces render an R square of better than 0.99. This linearity teaches an object of the current invention that by varying the force acting between a selected die and a selected visco elastic polymer deformable member, the rate of displacement and duration can be varied and predicted.

BRIEF DESCRIPTION OF THE DRAWINGS

The present invention is further described with reference to the accompanying drawings in which.

DETAILED DESCRIPTION OF THE DRAWINGS

Figure 1:
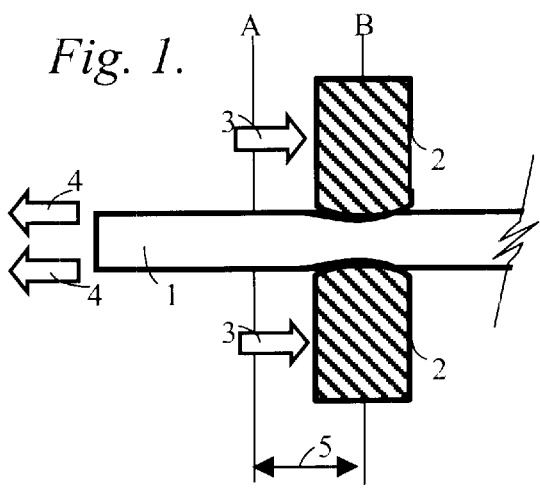
FIG. 1 is a schematic cross-sectional view, in fragment, of a deformable member being pulled through a fixed die after the teaching of the present invention.

FIG. 1 shows a deformable member 1 configured as a predetermined length of strip, tube, tape, rod and thick ribbon of resilient mainly polymeric construction and generally constant cross section, at least one die 2 selected to produce transverse deflection, deformation, and constriction on said deformable member by fixed and movable component means, and means for producing a force acting in opposition between said deformable member 1 as shown as force arrows 4 and said die 2 shown as force arrow 3 and selected to produce a predetermined rate of travel and longitudinal displacement such as from A to B along said length of said deformable member as said die addresses, constricts, deflects and deforms a new and additional increment of length 5 of said deformable member for each increment of time thereby controlling and restraining the full release of said force producing means.

In FIG. 1 the opposing nature of the force also shows said force pulling said deformable member through said die. On the other hand, FIG. 2 shows the visco elastic displacement controller whereby said means for producing a force pushes said deformable member through said die.

Figure 2:
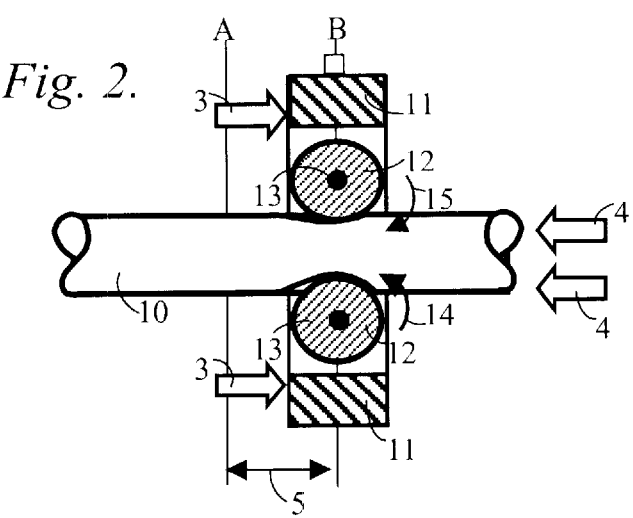
FIG. 2 is a schematic cross-sectional view, in fragment, of a deformable member being pushed through a die with movable components after the teaching of the present invention.

Also in FIG. 2 the movable components of said die 11 consists of rollers 12 mounted on axles 13 within a die frame and holding 11 whereby said rollers 12 are bearing on, deflecting, deforming, and constricting said deformable member 10 shown as a solid rod. The rollers 12 are shown to rotate with motion 14 and 15 relative to the same direction as the deformable rod member 10 which is being pushed by force arrows 4 while die rollers 12 and being restrained by force arrows 3 as the deformable rod member 10 moves through interval of displacement 5 from A to B.

Figure 3:
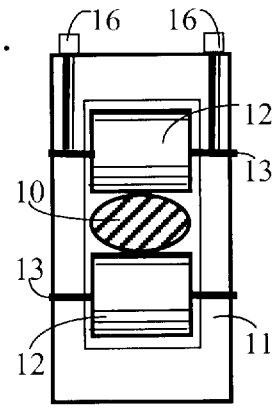
FIG. 3 is a cross-sectional view of the visco elastic displacement controller shown in FIG. 2.

In FIG. 3 the rollers 12 are movable components of a roller die holding 11. The gap between the rollers 12 is adjustable by set screws 16 acting against the upper axle 13 to increase or decrease the production of deflection, deformation, and constriction by creating compression, tension, and bending stresses within said deformable member during contact with said die roller 12. Also in FIG. 3 said deformable member moves in a generally axial direction that is orthogonal to said die.

Figure 4:
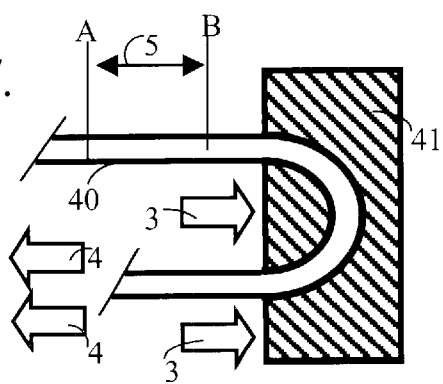
FIG. 4 is a schematic cross-sectional view in fragment of a deformable strip member being pulled around a cylindrical potion of a fixed tie after the teaching of the present invention.

FIG. 4 shows a visco elastic displacement controller whereby said deformable member 40 shown as a strip is urged by force arrows 4 as it passes through and around said components of said die 41 restrained by force arrows 3 and returning back in generally the same direction. In this case an element of length of the deformable strip member 40 moves from A to B in time interval 5.

Figure 5:
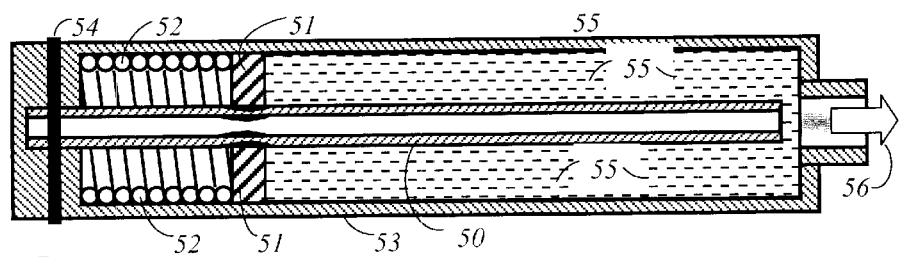
FIG. 5 is a cross sectional view of a lubricator that uses a fixed constricting die that is also a follower in a reservoir after the teaching of the present invention.

FIG. 5 shows a preferred embodiment of the visco elastic displacement controller as a lubricant dispenser 53 whereby said force producing means is a mechanical spring 52 that acts on the dispenser reservoir 51 that transfers the stress by anchorage 54 to a deformable tubular member 50 that is constricted and deflected by die 51. Die 51 acts as a follower for a reservoir of lubricant charge 55 to dispense this charge from opening 56 in the reservoir wall 53. It can be seen from FIG. 5 that the length of said deformable tubular member 50 is selected to provide a predicted duration of travel and displacement equivalent to generally empty said charge 55.

Further addressing FIG. 5 is an automatic dispenser comprising; a container having a container wall 53 and a follower 51; a flowable charge 55 disposed within said container 53; said container 53 having at least one closeable dispensing outlet 56 through which said flowable charge 55 is dispensed; and at least one deformable member 50 configured as a predetermined length of strip, tube, tape and rod of mainly polymeric construction and generally constant cross section, at least one die 51 selected to produce transverse constriction on said deformable member by fixed and movable component means, a prestressed spring 52 interposed between and producing a force in opposition to said container 53 and said follower and die 51, said spring 52 selected to produce a force that produces a predetermined rate of travel and longitudinal displacement along said length of said deformable member as said die addresses constricts, deflects and deforms a new and additional increment of length of said deformable member for each increment of time thereby controlling and restraining said follower to displace and dispense a generally constant quantity of said charge 55 from said container 52.

Figure 6:
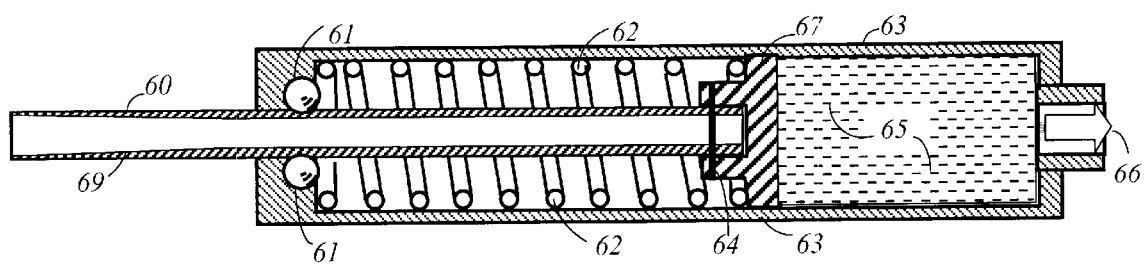
FIG. 6 is a cross sectional view of the viscous fluid dispenser of a beneficial fluid utilizing a die with movable components constricting a tubular deformable member connected to and in close proximity to a follower in a reservoir after the teaching of the present invention.

FIG. 6 shows another embodiment of the visco elastic displacement controller as a dispenser of beneficial fluids such as medications where the deformable member 60 communicates displacement to an follower 67 to generate dispensing. The deformable tubular member 60 is connected with an pin 64 to and in close proximity to a follower 67 within a fluid reservoir 65 and is selected to force by spring 62 and dispense a viscous fluid from said reservoir 65 at a predetermined rate and for a predetermined duration through opening 66 being delayed and controlled by movable ball die components 61 which constrict and constrain the tubular member 60. The deformable member 60 is selected to vary in cross section at 69 to compensate for predicted changes in said force producing means 62 during the predicted displacement duration to produce a generally linear timed travel and displacement.

Figure 7:
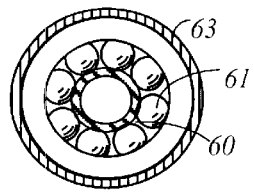
FIG. 7 is a cross section of the embodiment depicted in FIG. 6.

FIG. 7 shows a section through the drug dispenser 63. The radial arrangement of the movable ball components 61 around the deformable tubular member 60 is shown to deflect and constrict that member 60 and further be held in place by dispenser container 63 acting as a die holder.

Figure 8:
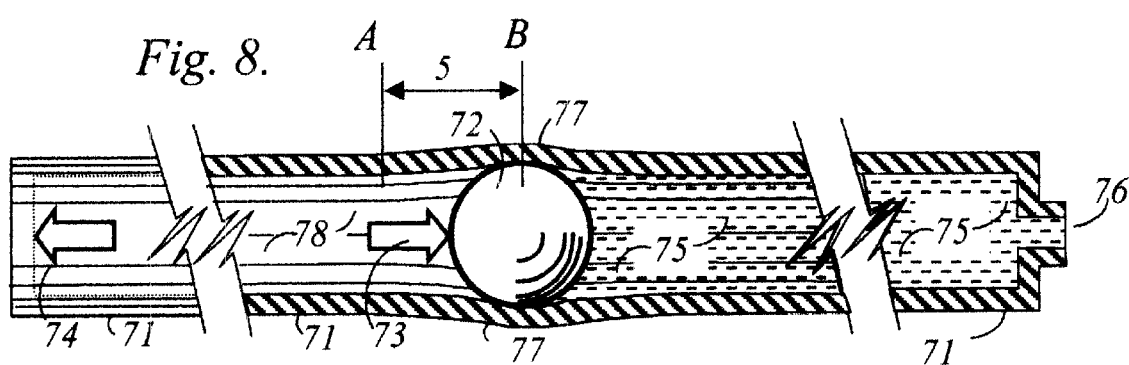
FIG. 8 is a cross sectional view in fragment of a ball die pushed through internal to a generally cylindrical deformable member.

In FIG. 8 the container wall 71 of an automatic dispenser is also the deformable member 77. FIG. 8 shows an automatic dispenser comprising; a container 71 having a container wall 77 of mainly resilient and deformable polymeric construction and generally constant tubular cross section,; a flowable charge 75 disposed within said container; said container 71 having at least one closeable dispensing outlet 76 through which said flowable charge is dispensed; and at least one ball die 72 or cylindrical die and follower internal to said container 71 selected of a larger diameter than the internal diameter of said container 71 to produce transverse strain and deformation on said deformable member 77 by fixed and movable component means, means for producing a force by pneumatic pressure 78 acting in opposition to said container 71 with force 74 and said die 72 with force 73, said force selected to produce a predetermined rate of travel and longitudinal displacement along said length of said container 71 from point A to point B as said die 72 addresses, deflects and deforms a new and additional increment of length 5 of said container 71 for each increment of time thereby controlling and restraining said follower 72 to displace and dispense a generally constant quantity of said charge 75 from said container 71. Said force producing means also comprises a pressurized hydraulic reservoir.

The polymeric deformable member is selected from the following thermoplastic resins: homopolymer and copolymer acetals, acrylics, acrylonitrilebutadiene-styrene, Deldrin, fluoropolymers, polyamides, polyamide-imides, polyarylates, poly-aryletherketones, polyaryl sulfones, polybenzimidazoles, polycarbonates, polybutylene terephthalates, polyether-imides, polyether sulfones, high-density polyethylenes, ultrahigh molecular weight polyethylenes, polyethylene terephthalates, thermoplastic polyimides, polyphenylene ethers/polyphenylene oxides, polyphenylene sulfides, reinforced polypropylenes, high-impact polystyrenes, polysulfones, thermoplastic polyurethanes, polyvinyl chlorides, styrene-acrylonitriles, styrene-maleic anhydrides, and Nylon 6/6. These materials possess various degrees of resilience but may be fabricated as long lengths of constant cross section strips, tubes, rods, or ribbons.

The criteria for selection of material for the deformable member is resilience which for the purposes of this invention is the ability to withstand large deflections without tearing or separation failure. Prototypes of the preferred embodiment as a lubricator incorporate a Deldrin deformable member.

Other embodiments of the present invention will be apparent to those skilled in the art in view of the foregoing descriptions. These descriptions are intended to provide specific examples of embodiments which clearly disclose the present invention. Accordingly, the present invention is not limited to the described embodiments or to the use of specific elements, dimensions, materials, or configurations contained therein. All alternative modifications and variations of the present invention which fall within the spirit and broad scope of the appended claims are covered.

What is claimed and worthy of a Letter Patent is:

1. A visco elastic displacement controller comprising:
   at least one deformable member configured as a predetermined length of either a strip, tube, tape, rod or thick ribbon of resilient mainly polymeric construction and generally constant cross section,
   at least one die selected to produce transverse deflection, deformation, and constriction on said deformable member by fixed and movable component means, and
   means for producing a force acting in opposition between said deformable member and said die and selected to produce a predetermined rate of travel and longitudinal displacement along said length of said deformable member as said die addresses, constricts, deflects and deforms a new and additional increment of length of said deformable member for each increment of time thereby controlling and restraining the full release of said force producing means.

2. The visco elastic displacement controller of claim 1 whereby said means for producing a force pulls said deformable member through said die.

3. The visco elastic displacement controller of claim 1 whereby said means for producing a force pushes said deformable member through said die.

4. The visco elastic displacement controller of claim 1 whereby said movable components of said die consist of rollers and balls bearing on, deflecting, deforming, and constricting said deformable member.

5. The visco elastic displacement controller of claim 1 whereby said die produces said deflection, deformation, and constriction by creating compression, tension, and bending stresses within said deformable member during contact with said die.

6. The visco elastic displacement controller of claim 1 whereby said deformable member moves in a generally axial direction that is orthogonal to said die.

7. The visco elastic displacement controller of claim 1 whereby said deformable member passes through and around said components of said die returning back in generally the same direction.

8. The visco elastic displacement controller of claim 1 whereby said force producing means is or a mechanical spring, a hanging weight, a pressurized hydraulic reservoir or a pressurized pneumatic reservoir.

9. The visco elastic displacement controller of claim 1 whereby the length of said deformable member is selected to provide a predicted duration of travel and displacement.

10. The visco elastic displacement controller of claim 1 whereby said cross section of said deformable member is selected to vary to compensate for predicted changes in said force producing means during the predicted displacement duration to produce a generally linear timed travel and displacement.

11. The visco elastic displacement controller of claim 1 whereby said deformable member is connected to and in close proximity to a follower within a fluid reservoir whereby said displacement of said deformable member dispenses a viscous fluid from said reservoir at a predetermined rate and for a predetermined duration.

12. An automatic dispenser comprising;
   a container having a container wall of mainly resilient and deformable polymeric construction and generally constant cross section,;
   a flowable charge disposed within said container; said container having at least one closeable dispensing outlet through which said flowable charge is dispensed; and
   at least one die and follower selected to produce transverse strain and deformation on said deformable member by fixed and movable component means,
   means for producing a force acting in opposition to said container and said die, said force selected to produce to produce a predetermined rate of travel and longitudinal displacement along said length of said container as said die addresses, deflects and deforms a new and additional increment of length of said container for each increment of time thereby controlling and restraining said follower to displace and dispense a generally constant quantity of said charge from said container.

* * * * *